(12) United States Patent
Lurk et al.

(10) Patent No.: US 9,018,890 B2
(45) Date of Patent: Apr. 28, 2015

(54) ELECTRIC MOTOR HAVING A PULSE WIDTH MODULATOR

(75) Inventors: Volker Lurk, Offenburg (DE); Nikolas Haberl, Sinzheim (DE); Frank Fischer, Buehl (DE); Christian Poddey, Oetigheim (DE); Michael Koerner, Buehl (DE); Tobias Stiefel, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 13/518,600

(22) PCT Filed: Dec. 1, 2010

(86) PCT No.: PCT/EP2010/068639
§ 371 (c)(1),
(2), (4) Date: Sep. 10, 2012

(87) PCT Pub. No.: WO2011/069869
PCT Pub. Date: Jun. 16, 2011

(65) Prior Publication Data
US 2013/0004148 A1    Jan. 3, 2013

(30) Foreign Application Priority Data

Dec. 8, 2009    (DE) .......................... 10 2009 047 645

(51) Int. Cl.
*H02P 23/00*    (2006.01)
*H02P 7/29*    (2006.01)
(52) U.S. Cl.
CPC ....................................... *H02P 7/29* (2013.01)
(58) Field of Classification Search
USPC .......... 318/811, 599; 388/829, 804, 831, 809, 388/803
See application file for complete search history.

(56) References Cited

U.S. PATENT DOCUMENTS 5,339,013 A    8/1994    Nakai et al.
5,589,805 A *    12/1996    Zuraski et al. ............... 332/109
(Continued)

FOREIGN PATENT DOCUMENTS

| DE | 10102038 | 9/2001 |
| DE | 102007031548 | 1/2009 |
| EP | 0366620 | 5/1990 |

OTHER PUBLICATIONS

International Search Report Application No. PCT/EP2010/068639 dated Jun. 13, 2012 (English Translation and Original, 4 pages).

*Primary Examiner* — Rina Duda
*Assistant Examiner* — Bickey Dhakal
(74) *Attorney, Agent, or Firm* — Michael Best & Friedrich LLP

(57) ABSTRACT

The invention relates to an electric motor having a stator and a rotor. The electric motor also comprises a controller, wherein the controller is connected to the stator and/or rotor, and is designed for applying current to the stator and/or rotor for rotating the rotor. According to the invention, the controller comprises a pulse width modulator designed for controlling a power output of the electric motor, in order to generate a predetermined number of different current application patterns. The current application patterns each represent a power output of the electric motor, and preferably comprise a time sequence of current pulses, each having a current pulse duration. The controller is designed for applying current to the electric motor according to at least two different current application patterns for actuating the electric motor during a time interval of actuation, such that a power output of the electric motor in the time-based average of the time interval of actuation, in particular from the beginning to the end of the time interval, is different from the power outputs represented by the current application patterns in the time interval of actuation.

15 Claims, 5 Drawing Sheets

(56) References Cited

U.S. PATENT DOCUMENTS

| | | |
|---|---|---|
| 6,433,507 B1 | 8/2002 | Makaran et al. |
| 6,674,962 B2 * | 1/2004 | Nadeau .......................... 388/804 |
| 2002/0011816 A1 * | 1/2002 | Misumi ......................... 318/599 |
| 2004/0232864 A1 * | 11/2004 | Sunaga et al. ................. 318/434 |

* cited by examiner

ELECTRIC MOTOR HAVING A PULSE WIDTH MODULATOR

BACKGROUND OF THE INVENTION

The invention relates to an electric motor having a stator and having a rotor. The electric motor also has a control unit, with the control unit being connected to the stator and/or to the rotor and being designed to supply current to the stator and/or to the rotor for the purpose of rotating the rotor.

DE 10 2007 031 548 A1 discloses an electric motor and a method for actuating the electric motor in which a pulse width modulator turns on two semiconductor switches alternately. The alternate turning-on of the two semiconductor switches prompts uniform heating of all semiconductors.

SUMMARY OF THE INVENTION

According to the invention, the control unit has a pulse width modulator which is designed to control a power output from the electric motor by producing a predetermined number of different current supply patterns. The current supply patterns each represent a power output from the electric motor, and preferably have a chronological sequence of current pulses with a respective current pulse duration and, with further preference, pulse pauses with a respective pulse pause duration.

The control unit is designed to actuate the electric motor—preferably with a different power than represented by a current supply pattern—during a time interval of actuation by supplying current to the electric motor on the basis of at least two different current supply patterns such that a power output from the electric motor on average over time for the time interval of actuation, particularly from the start to the end of the time interval, is different than the power outputs represented by the current supply patterns in the time interval of actuation. The time interval of actuation is also called the time interval below.

The pulse width modulator designed in this manner can advantageously produce at least one power output from the electric motor which is different than the power outputs represented by the predetermined current supply patterns, in particular is higher or lower. As a further advantage, the electric motor can thus be used to produce power outputs which, in each case as a current supply pattern with a chronological sequence of current pulses, produce a power loss in a power output stage, which are able to damage the power output stage. As a further advantage, it is thus possible to avoid current supply patterns which require switching times from a power output stage which would not be possible on account of an excessively small edge gradient for switching edges in the power output stage.

In one preferred embodiment of the electric motor, the power output from the electric motor on average over time for the time interval is greater than the lowest power output represented by a current supply pattern in the time interval. This advantageously allows a power output from the electric motor to be set which is in the top third of a power output range between zero percent and 100 percent, for example. With power outputs of less than 100 percent, for example, the power loss in the power output stage is high, or a requisite edge gradient for a switching edge is very steep.

In one preferred embodiment, the control unit is designed to produce current supply pattern intervals with a respective duration shorter than the time interval and to supply current to the electric motor during the current supply pattern interval using a predetermined current supply pattern, wherein the time interval has only current supply pattern intervals. Preferably, the different current supply pattern intervals alternate with maximum frequency in the time interval of actuation.

The effect advantageously achieved by this is that the time interval therefore has no current supply pattern pauses. The time interval is therefore free of blanking windows.

As a further advantage, the effect achieved by this is that a torque of the electric motor is available for each fraction of the time interval.

In one preferred embodiment, the duration of the current supply pattern intervals is of the same length in each case. As a result, it is advantageously possible for a clock generator which produces the current supply pattern intervals to produce the current supply pattern intervals with the same duration in each case.

In one preferred embodiment of the electric motor, the power output from the electric motor in the time interval is greater than 80 percent, preferably greater than 90 percent, and less than 100 percent of the maximum power output from the electric motor.

It is thus advantageously possible to avoid power losses which are produced for a power output of greater than 80 percent, preferably greater than 90 percent and less than 100 percent of the maximum power output using a current supply pattern which operates the stator and/or the rotor in pulse width modulated fashion. By way of example, the power loss in the power output stage at a power output of 100 percent is less than at 99 percent, for example, on account of absent switching losses.

In one advantageous embodiment of the electric motor, the electric motor is a brush-commutated DC motor. The brush-commutated electric motor has two or four brushes, for example, particularly carbon brushes. By way of example, the DC motor is a series-wound motor, in which the rotor is electrically connected in series with the stator. In another embodiment, the DC motor is a shunt-wound motor, in which the stator and the rotor are connected in parallel with one another.

Unlike in the case of the series-wound or shunt-wound motor, the electric motor may advantageously have a stator which is preferably of permanently magnetic design.

In one preferred embodiment of the electric motor, the control unit is designed to actuate the electric motor with at least three or precisely three time intervals which are different than one another and each represent an operating state, wherein one operating state from the operating states has the time interval with at least two different current supply patterns, wherein a further time interval of maximum power has only the current supply pattern which represents the maximum power output, and a further time interval has only one of the predetermined current supply patterns which represents a lower power output than the maximum power output. This means that the electric motor can advantageously be operated with at least three operating states. Of the at least three operating states, one operating state represents the operating state with maximum power, a further operating state represents the operating state with a lower power output than the maximum power, and a prohibited operating state represents the operating state in which the control unit actuates the power output stage in modulating fashion with current supply patterns which are different than one another.

The invention also relates to a method for operating an electric motor, in which current is supplied to a stator and/or a rotor of the electric motor for the purpose of rotating the rotor, wherein the electric motor is actuated with at least one of a predetermined number of different current supply patterns for the purpose of controlling a power output from the electric motor. The current supply patterns each represent a power output from the electric motor and preferably have a chronological sequence of current pulses with a respective current pulse duration and as a further preference have pulse pauses with a pulse pause duration, wherein the electric motor is actuated with a different power than represented by a predetermined current supply pattern, during a time interval of actuation, by virtue of current being supplied to the electric motor using at least two different current supply patterns such that a power output from the electric motor on average over time for the time interval, particularly from the start to the end of the time interval, is different than the power outputs represented by the current supply patterns in the time interval.

In one preferred variant of the method, the power output from the electric motor on average over time for the time interval is greater than the lowest power output represented by a current supply pattern in the time interval.

In one preferred embodiment of the method, current is supplied to the electric motor by producing current supply pattern intervals for a respective duration shorter than the time interval, and current is supplied to the electric motor during the current supply pattern intervals using a predetermined current supply pattern, wherein the time interval has only current supply pattern intervals.

BRIEF DESCRIPTION OF THE DRAWINGS

The invention will now be described below with reference to further exemplary embodiments and with reference to figures. Further advantageous variant embodiments are obtained from the features described in the dependent claims, and from the features described in the description of the figures.

DETAILED DESCRIPTION

Figure 1:
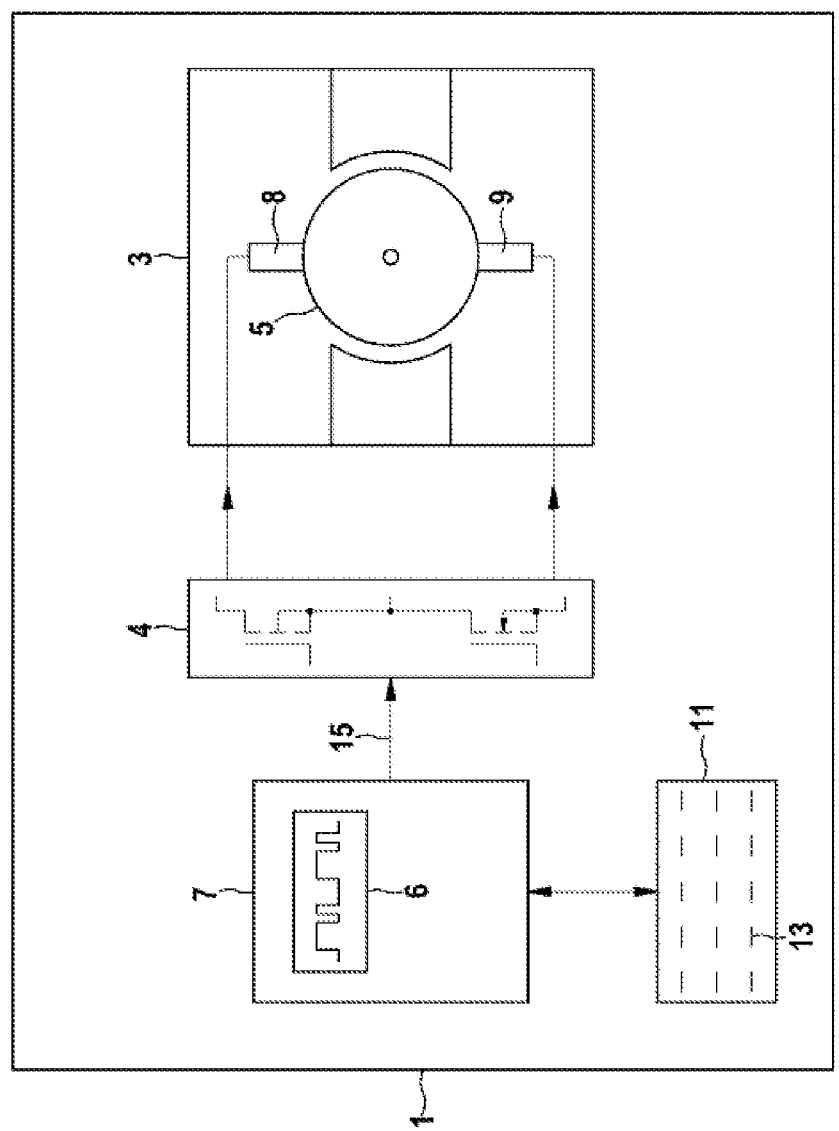
FIG. 1 shows an exemplary embodiment of an electric motor.

FIG. 1 shows an exemplary embodiment of an electric motor 1. The electric motor 1 has a stator 3 and a rotor 5. The electric motor 1 also has a control unit 7, the control unit 7 being connected to the rotor 5 by means of carbon brushes 8 and 9. In this exemplary embodiment, the stator of the electric motor is of permanently magnetic design.

The control unit 7 is connected to a memory 11 which is designed to keep a multiplicity of current supply patterns available, of which the current supply pattern 13 is denoted by way of example. The current supply patterns are each represented by a data record. The control unit 7 is designed to read at least one current supply pattern, for example the current supply pattern 13, from the memory 11 and to use the pulse width modulator 6 to produce a chronological sequence of current pulses with a respective current pulse duration or additionally pulse pauses with a respective pulse pause duration, wherein the chronological sequence of current pulses or additionally pulse pauses together represent the current supply pattern. The control unit 7 is connected to the power output stage 4 by means of a connecting line 15. The control unit 7 is designed to actuate the power output stage 4 via the connecting line 15 in accordance with the current supply pattern. The power output stage 4 supplies current to the rotor 5 of the electric motor via the carbon brushes 8 and 9 in accordance with the current supply pattern. The electric motor 1 then produces a power output which is represented by the current supply pattern.

Figure 2:
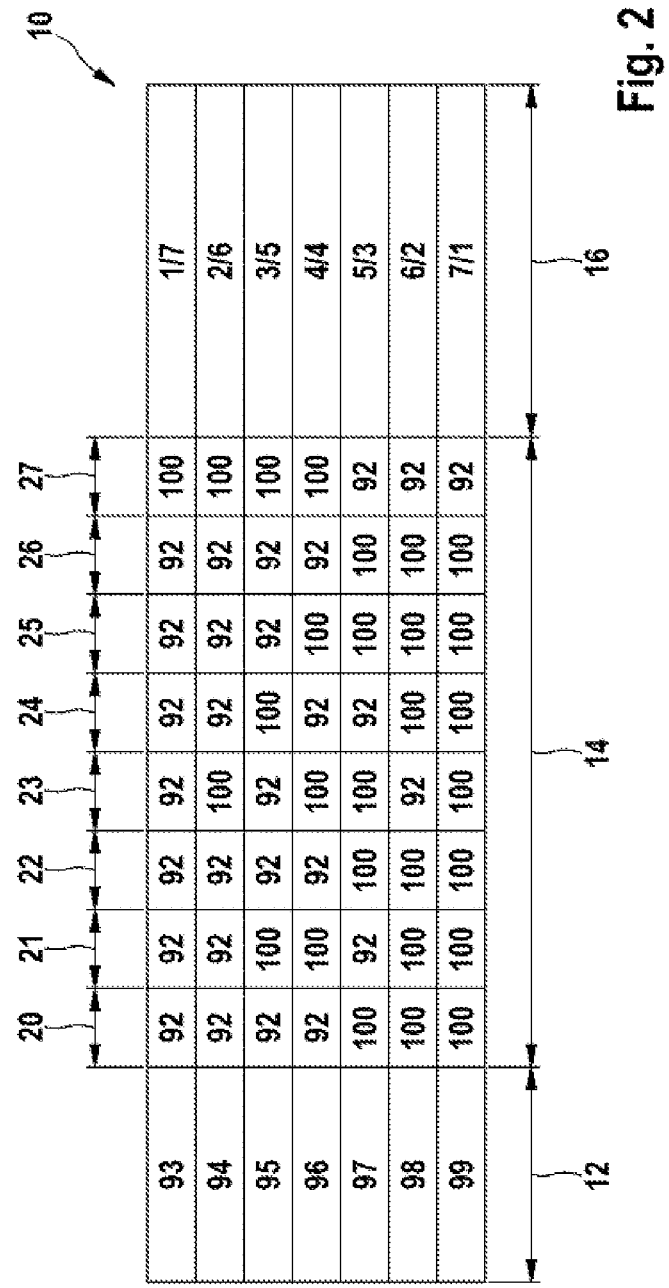
FIG. 2 shows an exemplary embodiment of a table which compares power outputs and current supply pattern combinations which correspond to the power outputs.

FIG. 2 shows a table 10 which shows predetermined power outputs from the electric motor in a column 12, which each represent a power output to be produced by the electric motor in the time interval 14 of actuation. Column 16 specifies switching alternation ratios for the relevant time intervals 14.

Columns 20, 21, 22, 23, 24, 25, 26 and 27 each represent a current supply pattern interval, with current being supplied to the power output stage using a predetermined current supply pattern in the current supply pattern interval.

By way of example, the control unit of the electric motor is designed to produce an effective power output of 93% by actuating the power output stage during the current supply pattern interval 20 using a current supply pattern which brings about a power output of 92%, brings about a power output of 92% in the current supply pattern interval 21, brings about a power output of 92% in the current supply pattern interval 22, brings about a power output of 92% in the current supply pattern interval 23, brings about a power output of 92% in the current supply pattern interval 24, brings about a power output of 92% in the current supply pattern interval 25, brings about a power output of 92% in the current supply pattern interval 26, and brings about a power output of 100% in the current supply pattern interval 27, in each case based on a full power output from the electric motor. The ratio between the current supply pattern interval with 100% power outputs and the current supply pattern intervals with 92% power output is one to seven in this case. The different current supply pattern intervals alternate with maximum frequency in the time interval 14 of actuation, as a result of which current supply pattern intervals with a greater power loss than at least one other current supply pattern interval are distributed as uniformly as possible in the time interval.

Figure 3:
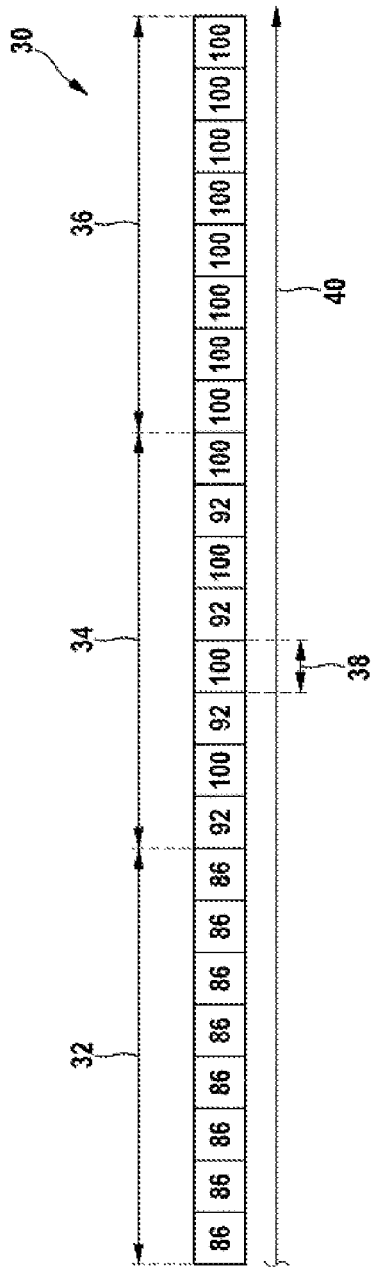
FIG. 3 shows an exemplary embodiment of a time profile for a power output from the electric motor, which has three different ranges.

FIG. 3 shows a time profile for a power output from the electric motor, for example the electric motor 1 shown in FIG. 1.

The time profile 30 shows a time axis 40 and three time ranges 32, 34 and 36. During the time range 32, the rotor 5 of the electric motor shown in FIG. 1 is being actuated by the control unit 7 using a current supply pattern which represents a power output from the electric motor 1 of 86 percent of the full power output. During the time range 34, which corresponds to the aforementioned time interval, the electric motor is actuated with two different current supply patterns, each of which the time interval contains equally in this example.

To this end, the time interval 34 comprises a plurality of current supply pattern intervals, in this exemplary embodiment 8 current supply pattern intervals, of which the current supply pattern interval 38 is denoted by way of example. During the current supply pattern intervals, the power output stage 4 of the electric motor 1 in FIG. 1 is actuated with a respective current supply pattern. The current supply pattern represents a power output which is respectively indicated in FIG. 3 fields of the time ranges 32, 34 and 36. The time ranges 32, 34 and 36 therefore each represent an operating state of the electric motor.

Figure 4:
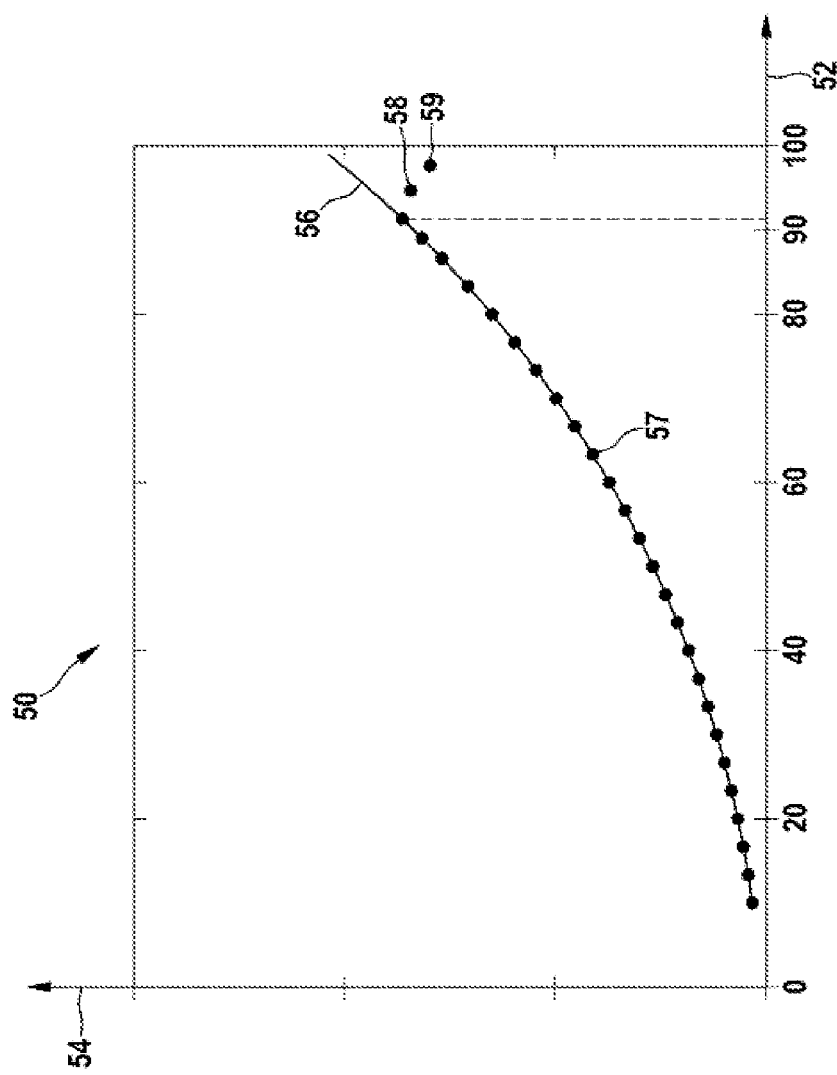
FIG. 4 shows a graph which shows power curves which each represent a power loss from the power output stage of the electric motor.

FIG. 4 shows a graph 50. The graph 50 has an abscissa 52 and an ordinate 54. The abscissa 52 represents a power output from the electric motor 1 shown in FIG. 1, and the ordinate 54 represents a power loss from the output stage 4 of the electric motor 1.

The graph shows a curve 56 which represents a power loss from the electric motor 1, which is actuated with just one current supply pattern from the predetermined current supply pattern for the purpose of producing a power output. At a power output of 100 percent, the power loss is just as great as at a power output of 70 percent, for example.

The graph also shows a dotted curve, from which the point 57 is denoted by way of example. The points 58 and 59 on the dotted curve each represent a power loss which, for the same power output, is smaller than the corresponding power loss which is represented by the curve 56.

The points 58 and 59 each represent a mode of the electric motor 1 in FIG. 1 in which the power output stage 4 is actuated with two different power supply patterns during the time interval 34 in FIG. 3. During the time interval 34, the power loss is smaller than in the case of actuation with just a current supply pattern at the same power output, shown by means of curve 56.

Figure 5:
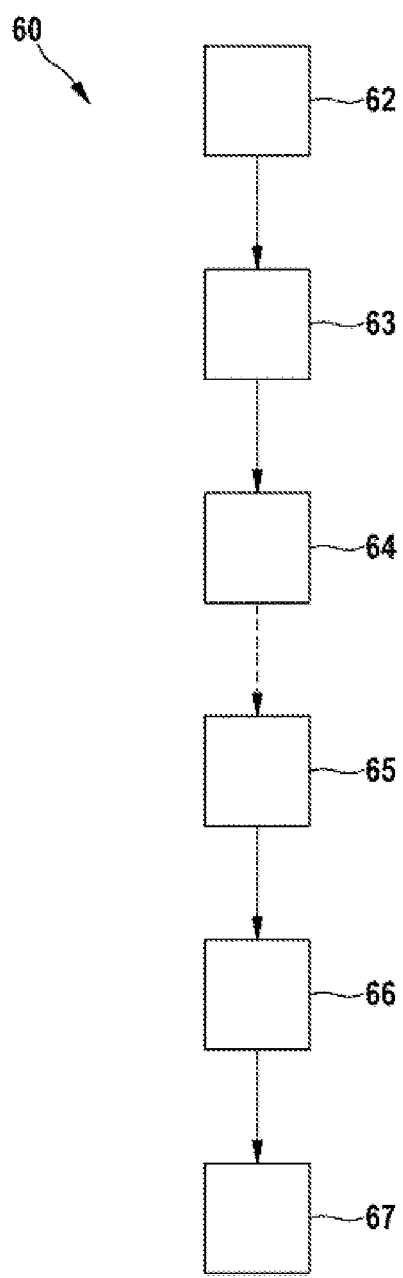
FIG. 5 shows an exemplary embodiment of a method for operating an electric motor.

FIG. 5 shows an exemplary embodiment of a method 60 for operating an electric motor, particularly a DC motor.

In a step 62, the electric motor, for example the electric motor 1 shown in FIG. 1, is operated with a predetermined power output and to this end is supplied with current using a current supply pattern from a predetermined number of current supply patterns which are kept available.

In a step 63, the electric motor is operated with a power output which is lower than the maximum power output and is greater than the power output in step 62, with current being supplied to the electric motor during a time interval in step 63, for example the time interval 34 in FIG. 3, with at least two or precisely two different current supply pattern intervals using a respective current supply pattern, which are contained in a predetermined ratio in the time interval.

In a step 64, the electric motor is operated at full power. Steps 62, 63 and 64 correspond to an increase in the power output from the electric motor. Step 65 corresponds to step 64, step 66 corresponds to step 63 and step 67 corresponds to step 62. Following the power increase to full power between steps 64 and 65, the power output from the electric motor is reduced—indicated by dashes—in this exemplary embodiment. Steps 65, 66 and 67 therefore correspond to a power reduction in the output power from full power through a relatively low power with modulated current supply pattern actuation to a power output lower than the power with modulated current supply pattern actuation, in which the electric motor is actuated constantly with one current supply pattern.

An exemplary frequency in which the current supply patterns alternate with one another or the current supply pattern intervals succeed one another, subsequently also called the toggle frequency, is between 250 and 2000 hertz, preferably 1000 hertz. By way of example, a pulse width modulation frequency is between 15 and 40 kilohertz, preferably between 18 and 30 kilohertz. Preferably, the pulse width modulation frequency is at least twenty times the toggle frequency, preferably at least or precisely thirty times the toggle frequency.

The invention claimed is:

1. An electric motor having a stator and a rotor, and having a control unit which is connected to at least one of the stator and the rotor and is designed to supply current to at least one of the stator and the rotor for the purpose of rotating the rotor, wherein the control unit has a pulse width modulator which is designed to control a power output from the electric motor by producing a predetermined number of different current supply patterns corresponding to current supply pattern intervals, wherein the current supply patterns each represent a power output from the electric motor and have a chronological sequence of current pulses with a respective current pulse duration for a corresponding one of the current supply pattern intervals, wherein the control unit is designed to actuate the electric motor with a different power than represented by a predetermined current supply pattern during a time interval of actuation by supplying current to the electric motor on the basis of at least two different current supply patterns during at least two corresponding current supply pattern intervals such that a predetermined power output from the electric motor on average over time for the time interval of actuation is different than the power outputs represented by the current supply patterns in the time interval of actuation, the time interval of actuation being greater than one of the current supply pattern intervals, and wherein the time interval of actuation has only the current supply pattern intervals.

2. The electric motor as claimed in claim 1, wherein the predetermined power output from the electric motor on average over time for the time interval of actuation is greater than the lowest power output represented by one of the current supply patterns in the time interval of actuation.

3. The electric motor as claimed in claim 1, wherein the predetermined power output from the electric motor in the time interval of actuation is greater than 80 percent and less than 100 percent of the maximum power output from the electric motor.

4. The electric motor as claimed in claim 1, wherein the electric motor is a DC motor commutated by means of brushes.

5. The electric motor as claimed in claim 1, wherein the stator of the electric motor is of permanently magnetic design.

6. The electric motor as claimed in claim 1, wherein power loss is minimized during the interval of actuation by operating with two predetermined current supply patterns as compared to operating the electric motor at a same constant power output for the interval of actuation.

7. An electric motor having a stator and a rotor, and having a control unit which is connected to at least one of the stator and the rotor and is designed to supply current to at least one of the stator and the rotor for the purpose of rotating the rotor, wherein the control unit has a pulse width modulator which is designed to control a power output from the electric motor by producing a predetermined number of different current supply patterns, wherein the current supply patterns each represent a power output from the electric motor and have a chronological sequence of current pulses with a respective current pulse duration, wherein the control unit is designed to actuate the electric motor with a different power than represented by a predetermined current supply pattern during a time interval of actuation by supplying current to the electric motor on the basis of at least two different current supply patterns such that a predetermined power output from the electric motor on average over time for the time interval of actuation is different than the power outputs represented by the current supply patterns in the time interval of actuation, wherein the control unit is designed to actuate the electric motor with at least three time intervals which are different than one another and each represent an operating state, wherein one of the time intervals has at least two different ones of the current supply patterns, wherein another of the time intervals that provides maximum power has only the current supply pattern which represents the maximum power output, and a further one of the time intervals has only one of the predetermined current supply patterns which represents a lower power output than the maximum power output.

8. A method for operating an electric motor, in which current is supplied to at least one of a stator and a rotor of the electric motor for the purpose of rotating the rotor, wherein the electric motor is actuated with at least one of a predetermined number of different current supply patterns for the purpose of controlling a power output from the electric motor, wherein the current supply patterns each represent a power output from the electric motor and have a chronological sequence of current pulses with a respective current pulse duration,
   wherein the electric motor is actuated with a different power than represented by a predetermined one of the current supply patterns during a time interval of actuation by virtue of current being supplied to the electric motor using at least two different current supply patterns such that a predetermined power output from the electric motor on average over time for the time interval of actuation is different than the power outputs represented by the current supply patterns in the time interval of actuation, and
   wherein current is supplied to the electric motor by producing current supply pattern intervals for a respective duration shorter than the time interval of actuation, and current is supplied to the electric motor during the current supply pattern intervals using predetermined ones of the current supply patterns, wherein the time interval of actuation has only the current supply pattern intervals.

9. The method as claimed in claim 8, wherein the predetermined power output from the electric motor on average over time for the time interval of actuation is greater than the lowest power output represented by one of the current supply patterns in the time interval of actuation.

10. The method for operating an electric motor as claimed in claim 8, wherein power loss is minimized during the interval of actuation by operating with two current supply patterns as compared to operating at a same constant power output.

11. An electric motor comprising a stator, a rotor, and a control unit connected to at least one of the stator and the rotor for supplying current to at least one of the stator and the rotor for the purpose of rotating the rotor, wherein the control unit includes a pulse width modulator for controlling a power output from the electric motor by producing a predetermined number of different predetermined current supply patterns,
   wherein the predetermined current supply patterns each represent a different power output from the electric motor and include a chronological sequence of current pulses with respective current pulse durations that define a current supply pattern interval,
   wherein the control unit actuates the electric motor with a different power output during one of the current supply pattern intervals than during another of the current supply pattern intervals,
   wherein a predetermined power output from the electric motor on average for the time interval of actuation is different than the power output represented by at least one of the current supply patterns, and
   wherein the respective current pulse durations of the chronological sequence of current pulses each have the same duration.

12. The electric motor as claimed in claim 11, wherein each of the current supply pattern intervals have the same duration.

13. The electric motor as claimed in claim 11, wherein power loss is minimized during the interval of actuation by operating with two current supply patterns as compared to operating at a same constant power output.

14. A method for operating an electric motor, in which current is supplied to at least one of a stator and a rotor of the electric motor for the purpose of rotating the rotor, wherein the electric motor is actuated with at least one of a predetermined number of different current supply patterns for the purpose of controlling a power output from the electric motor and have a chronological sequence of current pulses with a respective current pulse duration,
   wherein the electric motor is actuated with a different power than represented by a predetermined one of the current supply patterns during a time interval of actuation by virtue of current being supplied to the electric motor using at least two different current supply patterns such that a predetermined power output from the electric motor on average over time for the time interval of actuation is different than the power outputs represented by the current supply patterns in the time interval of actuation, wherein the chronological sequence of current pulses with the respective current pulse durations each have the same duration.

15. A method for operating an electric motor, in which current is supplied to at least one of a stator and a rotor of the electric motor for the purpose of rotating the rotor, wherein the electric motor is actuated with at least one of a predetermined number of different current supply patterns for the purpose of controlling a power output from the electric motor and have a chronological sequence of current pulses with a respective current pulse duration,
   wherein the electric motor is actuated with a different power than represented by a predetermined one of the current supply patterns during a time interval of actuation by virtue of current being supplied to the electric motor using at least two different current supply patterns such that a predetermined power output from the electric motor on average over time for the time interval of actuation is different than the power outputs represented by the current supply patterns in the time interval of actuation, and
   wherein each of the current supply patterns have the same duration.

* * * * *